(12) United States Patent
Matsushita et al.

(10) Patent No.: US 6,515,054 B1
(45) Date of Patent: Feb. 4, 2003

(54) BIODEGRADABLE RESIN COMPOSITION AND ITS MOLDED PRODUCT

(75) Inventors: Teruki Matsushita, Suita (JP); Yoshiko Atsumi, Itami (JP); Hiroshi Itoh, Kobe (JP)

(73) Assignee: Nippon Shokubai Co., Ltd., Osaka (JP)

( * ) Notice: Subject to any disclaimer, the term of this patent is extended or adjusted under 35 U.S.C. 154(b) by 5 days.

(21) Appl. No.: 09/695,080

(22) Filed: Oct. 25, 2000

(30) Foreign Application Priority Data

Nov. 2, 1999 (JP) ............................. 11-312232

(51) Int. Cl.⁷ ............................. C08J 5/10; C08K 5/41; C08L 67/00
(52) U.S. Cl. ........................ 524/167; 524/47; 524/156
(58) Field of Search ............................. 524/47–53, 156, 524/167

(56) References Cited

U.S. PATENT DOCUMENTS

| 5,256,711 | A |   | 10/1993 | Tokiwa et al. ................. 524/47 |
| 5,280,055 | A |   | 1/1994 | Tomka ........................ 524/47 |
| 5,308,879 | A |   | 5/1994 | Akamatu et al. ........... 521/84.1 |
| 5,703,160 | A |   | 12/1997 | Dehennau et al. ....... 525/54.24 |
| 5,869,590 | A | * | 2/1999 | Clark et al. .................. 526/323 |
| 6,110,983 | A | * | 8/2000 | Tokoro et al. ............... 521/56 |

FOREIGN PATENT DOCUMENTS

| JP | 507109 | 10/1993 |
| JP | 207047 | 7/1994 |
| JP | 271694 | 9/1994 |
| JP | 313063 | 11/1994 |
| JP | 331315 | 12/1994 |
| JP | 330954 | 12/1995 |
| JP | 188671 | 7/1996 |
| JP | 152602 | 6/1998 |
| JP | 158485 | 6/1998 |
| JP | 211959 | 8/1998 |
| JP | 508640 | 8/1998 |
| JP | 512010 | 11/1998 |
| JP | 500157 | 1/1999 |
| WO | 9118036 | 11/1991 |
| WO | 9615173 | 5/1996 |
| WO | 9625446 | 8/1996 |
| WO | 9631561 | 10/1996 |

\* cited by examiner

*Primary Examiner*—James J. Seidleck
*Assistant Examiner*—U. K. Rajguru
(74) *Attorney, Agent, or Firm*—Roylance, Abrams, Berdo & Goodman, L.L.P.

(57) ABSTRACT

The present invention provides a biodegradable resin composition and its molded product wherein the biodegradable resin composition exhibits excellent biodegradability and excellent mechanical strength, and further, is inexpensive, easy to process by molding, and usable for a wide range of purposes. The biodegradable resin composition comprises a biodegradable resin, a filler, and an anionic surfactant.

10 Claims, No Drawings

BIODEGRADABLE RESIN COMPOSITION AND ITS MOLDED PRODUCT

BACKGROUND OF THE INVENTION

A. Technical Field

The present invention relates to a biodegradable resin composition and its molded product. Specifically, the invention relates to a biodegradable composition and its molded product wherein the composition comprises a biodegradable resin.

B. Background Art

In recent years, as social demands for environmental preservation rise, biodegradable resins that are degradable by microorganisms etc. attract more and more attention. Specific examples of the above biodegradable resins include melt-moldable aliphatic polyesters such as poly (hydroxybutyrate), polycaprolactone, poly(lactic acid) and polybutylene succinate.

However, of the above conventional aliphatic polyesters, biodegradable resins producible by microorganisms, for example, poly(hydroxybutyrate), involve an extremely high cost, and further, biodegradable resins obtainable by chemical synthetic processes, such as polycaprolactone, poly (lactic acid) and polybutylene succinate, are also 2 to 3 times as expensive as olefinic resins etc. which are widely used. It is the existing circumstance that these problems on the cost deteriorate the wide usability of the biodegradable resins.

In recent years, in order to cope with such problems of the above biodegradable resins on the cost, studies are made about biodegradable resin compositions which are designed to involve low costs by mixing the biodegradable resins with inexpensive organic or inorganic fillers to increase the amounts of the compositions. Arts in which, of the fillers, starches having an effect to accelerate the biodegradation rate are used attract attention.

However, blending the above biodegradable resin with the filler needs an agent or process for promoting their compatibility, for example, surface-treating the filler, because, in the case where the compatibility between the biodegradable resin and the filler is poor, the mechanical strength of the resultant blend might so inferior that this blend might be difficult to apply to various uses of molded products, and further because some blending processes deteriorate the biodegradable resin.

To solve these problems, many processes are proposed in which processes starches are used as fillers and blended with the biodegradable resin.

For example, JP-A-512010/1998 proposes a process which comprises the steps of synthesizing a thermoplastic starch from a starch, sorbitol, and glycerol and then blending this thermoplastic starch with a biodegradable resin. However, this process has problems in that blending an active-proton-containing compound, such as sorbitol or glycerol, with a biodegradable resin of the polyester structure at high temperature deteriorates the biodegradable resin. Furthermore, this process is insufficient to compatibilize the biodegradable resin and the starch.

JP-A-207047/1994 proposes a process which comprises the step of blending a starch and a cellulose ester together. However, this process has problems in that a blend, obtained by this process, exhibits a fracture elongation merely less than 200% and is therefore a material poor in the mechanical strength.

JP-A-211959/1998 proposes a process in which an ethylene oxide adduct of acetylene glycol is used when blending corn starch and a biodegradable resin together. However, this process has problems in that blending an active-proton-containing component (included in the acetylene glycol compound) with a biodegradable resin of the polyester structure at high temperature deteriorates the biodegradable resin. Furthermore, this process is insufficient to compatibilize the biodegradable resin and the corn starch.

JP-A-330954/1995 proposes a process which comprises the steps of introducing polyethylene glycol as a diol component formable into an aliphatic polyester to synthesize a hydrophilicity-enhanced aliphatic polyester and then blending it with a starch. However, it is difficult to say that the synthesis of the diol-component-introduced aliphatic polyester for the purpose of only enhancing the compatibility with the starch is an easy process. Furthermore, this process disarranges the crystal structure and therefore decelerates the crystallization rate in the molding step.

JP-A-152602/1998 proposes a process in which polyethylene glycol is used when blending a starch and a biodegradable resin together. However, this process has problems in that, in the case where the blending step is carried out using a high hydrophilic polymer such as polyethylene glycol, the resultant blend feels sticky to the touch due to moisture, or the biodegradable resin deteriorates with the passage of time due to water absorbed into polyethylene glycol, and further in that polyethylene glycol is so hydrophilic as to merely have low compatibility with the biodegradable resin.

JP-A-158485/1998 and JP-A-313063/1994 propose a process in which a low-molecular aliphatic polyester is added when blending a high-molecular aliphatic polyester and a starch together. However, it is difficult to say that the synthesis of two kinds of high-molecular and low-molecular aliphatic polyesters for the purpose of only enhancing the compatibility with the starch is an easy process. Furthermore, this process is applicable only to specific aliphatic polyesters and therefore poor in the wide usability.

JP-A-331315/1993 and JP-A-188671/1996 propose a process which comprises the step of blending an aliphatic polyester with a pasty starch which is prepared by adding water to a starch. However, this process has problems in that water acts as active proton to deteriorate (hydrolyze) the biodegradable resin. Furthermore, this process is insufficient to compatibilize the biodegradable resin and the starch.

JP-A-271694/1994 proposes a process which comprises the step of blending a starchy polymer, a poly(vinyl alcohol), and a nonionic surfactant wherein the starchy polymer has a water content of 5 to 30 weight %. However, this process has problems in that water in the starchy polymer acts as active proton to deteriorate (hydrolyze) the biodegradable resin. Furthermore, this process is insufficient to compatibilize the biodegradable resin and the starchy polymer.

SUMMARY OF THE INVENTION

A. Object of the Invention

In order to solve the above problems, an object of the present invention is to provide a biodegradable resin composition and its molded product wherein the biodegradable resin composition exhibits excellent biodegradability and excellent mechanical strength, and further, is inexpensive, easy to process by molding, and usable for a wide range of purposes.

B. Disclosure of the Invention

Considering such existing circumstances, the present inventors diligently studied to solve the above-mentioned problems. As a result, they found that the moldability and the mechanical strength are enhanced by adding an anionic surfactant to a resin composition which comprises a biodegradable resin and a filler, and further that the mechanical strength is greatly enhanced if the anionic surfactant is particularly a sulfonic-acid-group-containing anionic surfactant.

Thus, a biodegradable resin composition, according to the present invention, comprises a biodegradable resin, a filler, and an anionic surfactant.

A molded product, according to the present invention, is a molded product from the above biodegradable resin composition according to the present invention.

These and other objects and the advantages of the present invention will be more fully apparent from the following detailed disclosure.

DETAILED DESCRIPTION OF THE INVENTION

There is no especial limitation in the biodegradable resin in the present invention if this resin is a thermoplastic resin having biodegradability. Specific examples of the biodegradable resin include: high-molecular aliphatic polyesters; and biodegradable polymers containing aromatic dicarboxylic acids as essential structural units.

The number-average molecular weight of the high-molecular aliphatic polyester in the present invention is not especially limited, but is, for example, in the range of 10,000 to 100,000, preferably in the range of 25,000 to 100,000, more preferably in the range of 40,000 to 100,000. In the case where the number-average molecular weight of the high-molecular aliphatic polyester is lower than the above range, there are disadvantages in that a biodegradable resin composition containing this high-molecular aliphatic polyester exhibits so low mechanical strength as to be unusable for purposes which need strength of such as a molded product. On the other hand, the number-average molecular weight of the high-molecular aliphatic polyester is higher than the above range, there are disadvantages in that it might be impossible to successfully compatibilize the high-molecular aliphatic polyester and the filler.

The high-molecular aliphatic polyester can be obtained, for example, by: i) a process comprising the step of polycondensing a polybasic acid (or ester thereof) with a glycol; ii) a process comprising the step of polycondensing a hydroxycarboxylic acid (or ester thereof); iii) a process comprising the step of carrying out a ring-opening polymerization of a cyclic acid anhydride with a cyclic ether; or iv) a process comprising the step of carrying out a ring-opening polymerization of a cyclic ester.

Examples of the polybasic acid used in the process i) above include succinic acid, adipic acid, suberic acid, sebacic acid, azelaic acid, decanedicarboxylic acid, octadecanedicarboxylic acid, dimer acid, and their esters. Examples of the glycol include ethylene glycol, propylene glycol, 1,3-propanediol, 1,4-butanediol, neopentyl glycol, 1,5-pentanediol, 1,6-hexanediol and decamethylene glycol. In addition, polyoxyalkylene glycols, such as polyoxyethylene glycol, polyoxypropylene glycol, polyoxytetramethylene glycol, and their copolymers, are also available as a part of the glycol components. Preferable among these are a combination of succinic acid with ethylene glycol and/or a combination of succinic acid with 1,4-butanediol in consideration of the meting point, the biodegradability and the economical advantage of the resultant polyester.

Examples of the hydroxycarboxylic acid used in the process ii) above include glycolic acid, lactic acid, 3-hydoxypropionic acid, 3-hydroxy-2,2-dimethylpropionic acid, 3-hydroxy-3-methyl-butyric acid, 4-hydroxybutyric acid, 5-hydroxyvaleric acid, 3-hydroxybutyric acid, 3-hydroxyvaleric acid, 4-hydroxyvaleric acid, 6-hydroxycaproic acid, citric acid, malic acid, and their esters. It is no problem to perform the polycondensation reaction by a conventional transesterification process or esterification process or joint use of both processes.

Examples of the cyclic acid anhydride used in the process iii) above include succinic anhydride, maleic anhydride, itaconic anhydride, glutaric anhydride, adipic anhydride and citraconic anhydride. Examples of the cyclic ether include ethylene oxide, propylene oxide, cyclohexene oxide, styrene oxide, epichlorohydrin, allyl glycidyl ether, phenyl glycidyl ether, tetrahydrofuran, oxepane and 1,3-dioxolane. Preferable among these is a combination of succinic anhydride with ethylene oxide in consideration of the meting point, the biodegradability and the economical advantage of the resultant polyester. The ring-opening polymerization can be carried out by methods such as polymerization in inert solvents (e.g. benzene, toluene, xylene, cyclohexane, n-hexane, dioxane, chloroform, dichloroethane) or bulk polymerization, which methods involve the use of conventional ring-opening polymerization catalysts such as metal oxide compounds (e.g. zirconyl octanoate, tetraalkoxyzirconium, trialkoxyaluminum compounds).

Examples of the cyclic ester used in the process iv) above include β-propiolactone, β-methyl-β-propiolactone, δ-valerolactone, ε-caprolactone, glycolide and lactide. The ring-opening polymerization can be carried out, similarly to the process iii) above, by methods such as polymerization in solvents or bulk polymerization, which methods involve the use of conventional ring-opening polymerization catalysts.

The process iii), comprising the step of carrying out a ring-opening polymerization of a cyclic acid anhydride with a cyclic ether, is preferable as a process which enables to produce the high-molecular aliphatic polyester with industrially good efficiency in a comparatively short time among the above processes for producing the high-molecular aliphatic polyester.

In the case where the number-average molecular weight of a polyester obtained by the process i), ii), iii) or iv) above is lower than 10,000, this polyester may also be converted into a high-molecular one by a transesterification reaction or a reaction with various chain-extending agents. Examples of the chain-extending agent include isocyanate compounds, epoxy compounds, aziridine compounds, oxazoline compounds, polyvalent metal compounds, polyfunctional acid hydrides, phosphoric acid esters and phosphorous acid esters. These may be used either alone respectively or in combinations with each other. The method for the reaction between the chain-extending agent and the polyester is not especially limited, but examples thereof include: a method comprising the steps of dissolving the polyester into an appropriate solvent and then causing the polyester to react with the chain-extending agent; and a method comprising the steps of heat-melting the polyester and then causing the polyester to react with the chain-extending agent.

The biodegradable polymers containing aromatic dicarboxylic acids as essential structural units in the present invention are not especially limited, but examples thereof include those which have a number-average molecular weight of usually 5,000 to 100,000, preferably 10,000 to 80,000, more preferably 20,000 to 50,000, and a melting point of usually 60 to 200° C., preferably 80 to 160° C., and specific examples thereof include polyesters, polyester ethers, polyester amides, and polyether ester amides.

The biodegradable polyesters containing aromatic dicarboxylic acids as essential structural units are, for example, obtainable by conventional processes involving the main use of either or both of terephthalic acid (or its ester) and adipic acid (or its ester) with the following compounds: glycols having at least two carbon atoms; compounds having at least three groups that can form esters; sulfonate compounds; hydroxycarboxylic acids; diisocyanates; bisoxazoline; or divinyl ether (e.g. JP-A-507109/1993, JP-A-508640/1998, JP-A-500157/1999).

In addition, it is also possible to prepare the biodegradable resin by synthesizing a widely usable saturated polyester and a biodegradable polyester separately from each other, and then melt-kneading them together, thereby carrying out transesterification therebetween, in conventional ways (for example, JP-A-003180/1997). Examples of the widely usable saturated polyester include polyethylene terephthalate, polybutylene terephthalate, poly(1,4-cyclohexanedimethylene terephthalate), poly(1,4-cyclohexanedimethylene ethylene terephthalate), poly(1,4-cyclohexanedimethylene terephthalate isophthalate), and poly(ethylene naphthalenedicarboxylate). Examples of the biodegradable polyester include: poly($\alpha$-hydroxy acids), such as polyethylene succinate, polybutylene succinate, polybutylene succinate adipate, polyhexamethylene succinate, polyethylene adipate, polyhexamethylene adipate, polybutylene adipate, polyethylene oxalate, polybutylene oxalate, polyneopentyl oxalate, polyethylene sebacate, polybutylene sebacate, polyhexamethylene sebacate, poly(glycolic acid) and poly(lactic acid), or their copolymers; poly($\omega$-hydroxyalkanoates) such as poly($\epsilon$-caprolactone) and poly($\beta$-propiolactone); poly($\beta$-hydroxyalkanoates) such as poly(3-hydroxybutyrate), poly(3-hydroxyvalerate), poly(3-hydroxycaproate), poly(3-hydroxyheptanoate) and poly(3-hydroxyoctanoate); and poly(4-hydroxybutyrate). Incidentally, the number-average molecular weight of the biodegradable polyester is in the range of usually 5,000 to 200,000, preferably 10,000 to 100,000, more preferably 30,000 to 80,000, still more preferably 50,000 to 80,000.

The combining ratio of the above biodegradable resin in the biodegradable resin composition is not especially limited, but is preferably in the range of 10 to 95 weight %, more preferably in the range of 30 to 90 weight %, still more preferably in the range of 40 to 85 weight %, of the biodegradable resin composition. In the case where the combining ratio of the biodegradable resin is lower than the above range, there are disadvantages in that the mechanical strength tends to be much low. On the other hand, in the case where the combining ratio of the biodegradable resin is higher than the above range, there are disadvantages in that the ratio of the filler is so low that the effect of the addition of the filler is low or appears little.

The filler in the present invention is not especially limited, but organic fillers which have biodegradability are preferable. Specific examples thereof include starches (e.g. starch polymers, natural starch extracted from plants), poly(vinyl alcohol), poly(ethylene oxide), cellulose, cellulose derivatives and natural rubber. These may be used either alone respectively or in combinations with each other.

In the present invention, particularly preferable among the above-exemplified fillers are the starches (e.g. starch polymers, natural starch extracted from plants), and specific examples thereof include raw starches (grain starch such as corn starch, potato starch, sweet potato starch, wheat starch, cassava starch, sago starch, tapioca starch, millet starch, rice starch, bean starch, arrowroot starch, bracken starch, lotus starch and water caltrop starch), physically modified starches (e.g. $\alpha$-starch, fractionated amylose, moistly and thermally treated starch), enzymatically modified starches (e.g. hydrolyzed dextrin, enzymolyzed dextrin, amylose), chemical decomposition-modified starches (e.g. acid-treated starch, hypochlorous acid-oxidized starch, dialdehyde starch), chemically modified starch derivatives (e.g. esterified starch, etherified starch, cationized starch, crosslinked starch), and their mixtures. Examples of the esterified starch among the chemically modified starch derivatives include acetate-esterified starch, succinate-esterified starch, nitrate-esterified starch, phosphate-esterified starch, urea phosphate-esterified starch, xanthate-esterified starch and acetoacetate-esterified starch. Examples of the etherified starch include allyl-etherified starch, methyl-etherified starch, carboxymethyl-etherified starch, hydroxyethyl-etherified starch, and hydroxypropyl-etherified starch. Examples of the cationized starch include: a product from a reaction between starch and 2-diethylaminoethyl chloride; a product from a reaction between starch and 2,3-epoxypropyltrimethylammonium chloride; high amylopectin starch; high amylose starch; cationic type and concentration-modified starch as bonded to a phosphate group; ethoxylated starch; acetated starch; cationic starch; hydrolyzed starch; and oxidized and crosslinked starch.

Furthermore, as to the filler in the present invention, particularly preferable among the above-exemplified starches are starches such as corn starch, potato starch, sweet potato starch, and wheat starch. The use of these starches as fillers enables to keep the moldability and the biodegradability without doing damage to the mechanical strength.

In addition, the above-exemplified starches may be converted into thermoplastic starches by adding such as water or alcoholic compounds, or by devising treatment methods such as heating treatment. Such thermoplastic starches are particularly preferable for the moldability.

The aforementioned organic fillers which have biodegradability are preferable as the filler in the present invention, but inorganic and/or organic compounds which have no biodegradability may be used as the filler for the purpose of applying the biodegradable resin composition to various molding methods or uses. In the case where the filler which has no biodegradability is used, its combining ratio is preferably not higher than 10 weight %, more preferably not higher than 5 weight %, of the biodegradable resin composition. In the case where the combining ratio of the inorganic and/or organic compound as the filler which has no biodegradability is higher than the above range, there is a disadvantageous tendency toward that: the biodegradability is deteriorated, and further, the filler does not entirely disperse into the biodegradable resin, therefore the physical property deterioration, such as strength lowering, is caused. Incidentally, examples of fillers which are inorganic compounds include calcium carbonate, clay, talc, aluminum hydroxide, and magnesium hydroxide.

In the present invention, it is preferable to beforehand treat the surface of the filler with the below-mentioned anionic surfactant, thereby enabling the filler to uniformly disperse into the biodegradable resin.

The combining ratio of the above filler in the biodegradable resin composition is not especially limited, but is preferably in the range of 5 to 90 weight %, more preferably in the range of 30 to 90 weight %, still more preferably in the range of 40 to 85 weight %, of the biodegradable resin composition. In the case where the combining ratio of the filler is lower than the above range, there are disadvantages in that the effect of the addition of the filler is low or appears little. On the other hand, in the case where the combining ratio of the filler is higher than the above range, the mechanical strength of the biodegradable resin composition might be weak because the ratio of the biodegradable resin which is a continuous phase might be too low for the filler to disperse into the biodegradable resin.

There is no especial limitation in the anionic surfactant in the present invention, if the surfactant, for example, has a structure containing a hydrophobic group and a hydrophilic group in its molecule wherein the hydrophilic group can be converted into an anion in the form of such as metal salts of carboxylic or sulfonic acids in water. Containing such an anionic surfactant can compatibilize the biodegradable resin and the filler.

Specific examples of the anionic surfactant include: aliphatic carboxylic acids such as lauric acid, myristic acid, palmitic acid, stearic acid, and oleic acid; fatty acid soaps such as sodium salts or potassium salts of the above aliphatic carboxylic acids; N-acyl-N-methylglycine salts, N-acyl-N-methyl-β-alanine salts, N-acylglutamic acid salts, polyoxyethylene alkyl ether carboxylic acid salts, acylated peptides, alkylbenzenesulfonic acid salts, alkylnaphthalenesulfonic acid salts, naphthalenesulfonic acid salt-formalin polycondensation products, melaminesulfonic acid salt-formalin polycondensation products, dialkylsulfosuccinic acid ester salts, alkyl sulfosuccinate disalts, polyoxyethylene alkylsulfosuccinic acid disalts, alkylsulfoacetic acid salts, (α-olefinsulfonic acid salts, N-acylmethyltaurine salts, sodium dimethyl 5-sulfoisophthalate, sulfated oil, higher alcohol sulfuric acid ester salts, polyoxyethylene alkyl ether sulfuric acid salts, secondary higher alcohol ethoxysulfates, polyoxyethylene alkyl phenyl ether sulfuric acid salts, monoglysulfate, sulfuric acid ester salts of fatty acid alkylolamides, polyoxyethylene alkyl ether phosphoric acid salts, polyoxyethylene alkyl phenyl ether phosphoric acid salts, alkyl phosphoric acid salts, sodium alkylamine oxide bistridecylsulfosuccinates, sodium dioctylsulfosuccinate, sodium dihexylsulfosuccinate, sodium dicyclohexylsulfosuccinate, sodium diamylsulfosuccinate, sodium diisobutylsulfosuccinate, alkylamine guanidine polyoxyethanol, disodium sulfosuccinate ethoxylated alcohol half esters, disodium sulfosuccinate ethoxylated nonylphenol half esters, disodium isodecylsulfosuccinate, disodium N-octadecylsulfosuccinamide, tetrasodium N-(1,2-dicarboxyethyl)-N-octadecylsulfosuccinamide, disodium mono- or didodecyldiphenyl oxide disulfonates, sodium diisopropylnaphthalenesulfonate, and neutralized condensed products from sodium naphthalenesulfonate. These anionic surfactants may be used either alone respectively or in combinations with each other.

As to the anionic surfactant in the present invention, particularly preferable among the above-exemplified ones are sulfonic-acid-group-containing anionic surfactants, and more preferable anionic surfactants are sulfosuccinic compounds. Specific examples of the preferable anionic surfactants include dialkylsulfosuccinic acid ester salts, alkyl sulfosuccinate disalts, polyoxyethylene alkylsulfosuccinic acid disalts, alkylsulfoacetic acid salts, (α-olefinsulfonic acid salts, sodium alkylamine oxide bistridecyl-sulfosuccinates, sodium dioctylsulfosuccinate, sodium dihexylsulfosuccinate, sodium dicyclohexylsulfosuccinate, sodium diamylsulfosuccinate, sodium diisobutyl-sulfosuccinate, disodium sulfosuccinate ethoxylated alcohol half esters, disodium sulfosuccinate ethoxylated: nonylphenol half esters, disodium isodecylsulfosuccinate, disodium N-octadecylsulfosuccinamide, and tetrasodium N-(1,2-dicarboxyethyl)-N-octadecylsulfosuccinamide, because these can more greatly enhance the dispersibility of the filler into the biodegradable resin.

The combining ratio of the above anionic surfactant is not especially limited, but is in the range of usually 0.001 to 100 weight %, preferably in the range of 0.01 to 50 weight %, more preferably in the range of 0.1 to 20 weight %, most preferably in the range of 0.1 to 10 weight %, of the biodegradable resin. In the case where the combining ratio of the anionic surfactant is: lower than 0.001 weight % of the biodegradable resin, the biodegradable resin might not sufficiently be surface-treated with the anionic surfactant, therefore it might be difficult that the effect of the addition of the anionic surfactant appears enough to obtain a biodegradable resin composition having sufficient mechanical strength. On the other hand, in the case where the combining ratio of the anionic surfactant is higher than 100 weight % of the biodegradable resin, the amount of the anionic surfactant might be too large to obtain a biodegradable resin composition having sufficient mechanical strength. In addition, the combining ratio of the above anionic surfactant may be in the range of 0.1 to 100 weight % of the filler, and this ratio is preferably in the range of 0.2 to 50 weight %, more preferably in the range of 0.3 to 20 weight %, most preferably in the range of 0.3 to 10 weight %, of the filler. In the case where the combining ratio of the anionic surfactant is lower than 0.1 weight % of the filler, the filler might not sufficiently be surface-treated with the anionic surfactant, therefore it might be difficult that the effect of the addition of the anionic surfactant appears enough to obtain a biodegradable resin composition having sufficient mechanical strength. On the other hand, in the case where the combining ratio of the anionic surfactant is higher than 100 weight % of the filler, the amount of the anionic surfactant might be too large to obtain a biodegradable resin composition having sufficient mechanical strength.

The combining ratio of the above anionic surfactant is most preferably such as simultaneously satisfies the above-defined range of the combining ratio of the anionic surfactant to the biodegradable resin and that to the filler, and is, for example, preferably in the range of 0.05 to 20 weight % of the biodegradable resin composition.

In the biodegradable resin composition according to the present invention, the combining ratio of the biodegradable resin to the filler (biodegradable resin/filler) (weight ratio) is preferably in the range of 30/70 to 90/10, more preferably in the range of 40/60 to 80/20. In the case where the ratio deviates from the above range, there are disadvantages in that a biodegradable resin composition having high mechanical strength is not obtainable.

The biodegradable resin composition according to the present invention may further comprise another component, such as an organic solvent, a polyether compound having a number-average molecular weight of 30 to 20,000, an acetylene glycol compound, or an organic compound having a high boiling point, in addition to the anionic surfactant for the purpose of more enhancing the compatibility. These may be used either alone respectively or in combinations with each other.

Examples of the above organic solvent include n-pentane, n-hexane, isohexane, n-heptane, n-octane, isooctane, n-decane, 2,2-dimethylbutane, petroleum ether, petroleum benzine, ligroin, gasoline, kerosine, petroleum spirit, petroleum naphtha, 2-pentene, mixed pentene, cyclohexane, methylcyclohexane, benzene, toluene, xylene, ethylbenzene, diethylbenzene, isopropylbenzene, amylbenzene, diamylbenzene, triamylbenzene, tetraamylbenzene, dodecylbenzene, didodecylbenzene, amyltoluene, coal tar naphtha, solvent naphtha, p-cymene, naphthalene, tetralin, decalin, biphenyl, dipentene, turpentine oil, pinene, p-menthane, pine oil, camphor oil, methyl chloride, methylene chloride, chloroform, carbon tetrachloride, ethyl chloride, ethylene chloride, ethylidene chloride, 1,1,1-trichloroethane, 1,1,2-trichloroethane, 1,1,1,2-tetrachloroethane, 1,1,2,2-tetrachloroethane, pentachloroethane, hexachloroethane, vinylidene chloride, 1,2-dichloropropane, butyl chloride, amyl chloride, mixed amyl chloride, dichloropentane, hexyl chloride, 2-ethylhexyl chloride, methyl bromide, ethyl bromide, ethylene bromide, tetrabromoethane, chlorobromomethane, ethylene chlorobromide, chlorobenzene, o-dichlorobenzene, 1,2,4-trichlorobenzene, bromobenzene, o-dibromobenzene, o-chlorotoluene, p-chlorotoluene, α-chloronaphthalene, chlorinated naphthalene, fluorodichloromethane, dichlorodifluoromethane, fluorotrichloromethane, trifluoromonobromomethane, difluorochloroethane, 1,1,2-trichloro-1,2,2-trifluoroethane, ethyl ether, dichloroethyl ether, isopropyl ether, n-butyl ether, diisoamyl ether, n-hexyl ether, methyl phenyl ether, ethyl phenyl ether, n-butyl phenyl ether, amyl phenyl ether, o, m, p-cresyl methyl ether, p-t-amylphenyl n-amyl ether, ethyl benzyl ether, 1,4-dioxane, trioxane, furan, furfural, dioxolane, 2-methylfuran, tetrahydrofuran, cineol, methylal, diethyl acetal, acetone, methylacetone, methyl ethyl ketone, methyl n-propyl ketone, methyl n-butyl ketone, methyl isobutyl ketone, methyl n-amyl ketone, methyl n-hexyl ketone, diethyl ketone, ethyl n-butyl ketone, di-n-propyl ketone, diisobutyl ketone, 2,6,8-trimethylnonanone-4, acetone oil, acetonylacetone, mesityl oxide, phorone, isophorone, cyclohexanone, methylcyclohexanone, acetophenone, dypnone, camphor, methyl formate, ethyl formate, propyl formate, n-butyl formate, isobutyl formate, methyl acetate, ethyl acetate, n-propyl acetate, isopropyl acetate, n-butyl acetate, isobutyl acetate, sec-butyl acetate, n-amyl acetate, isoamyl acetate, methylisoamyl acetate, methoxybutyl acetate, sec-hexyl acetate, 2-ethylbutyl acetate, methyl-isobutylcarbinol acetate, 2-ethylhexyl acetate, cyclohexyl acetate, methylcyclohexyl acetate, benzyl acetate, methyl propionate, ethyl propionate, n-butyl propionate, isoamyl propionate, methyl butyrate, ethyl butyrate, n-butyl butyrate, isoamyl butyrate, ethyl oxyisobutyrate, butyl stearate, amyl stearate, methyl acetoacetate, ethyl acetoacetate, isoamyl isovalerate, methyl lactate, ethyl lactate, butyl lactate, amyl lactate, methyl benzoate, ethyl benzoate, propyl benzoate, butyl benzoate, isoamyl benzoate, benzyl benzoate, ethyl cinnamate, methyl salicylate, octyl adipate, diethyl oxalate, dibutyl oxalate, diamyl oxalate, diethyl malonate, dibutyl tartrate, tributyl citrate, dioctyl sebacate, dimethyl phthalate, diethyl phthalate, dibutyl phthalate, di-2-ethylhexyl phthalate, dioctyl phthalate, nitromethane, nitroethane, nitropropane, nitrobenzene, nitroanisole, monomethylamine, dimethylamine, trimethylamine, monoethylamine, diethylamine, triethylamine, aniline, toluidine, acetoamide, acetonitrile, benzonitrile, pyridine, picoline, lutidine, quinoline, morpholine, carbon disulfide, dimethyl sulfoxide, propanesulfone, and triethyl phosphate. Of these, particularly, at least one member selected from the group consisting of cyclohexane, n-heptane, n-dodecane, chloroform, benzene, toluene, and n-hexane is preferable, because these have excellent compatibility with the biodegradable resin and enhances the dispersibility of the filler. These organic solvents may be used either alone respectively or in combinations with each other.

Examples of the above polyether compound having a number-average molecular weight of 30 to 20,000 include polyethylene glycol, polypropylene glycol, polytetramethylene glycol, and polyepichlorohydrin.

There is no limitation in the above acetylene glycol compound if it is a compound having both an acetylene group and a glycol group in its molecule. Typical known-in-public examples thereof include: 3-methyl-1-butyn-3-ol, 3,5-dimethyl-1-hexyn-3-ol, 3-methyl-1-pentyn-3-ol, 2,4,7,9-tetramethyl-5-decyne-4,7-diol; ethylene oxide adducts of 3-methyl-1-pentyn-3-ol or 2,4,7,9-tetramethyl-5-decyne-4,7-diol; and 3,6-dimethyl-4-octyne-3,6-diol.

The combining ratio of the above acetylene glycol compound is preferably in the range of 0.0001 to 5 parts by weight, more preferably in the range of 0.1 to 2 parts by weight, per 100 parts by weight of the biodegradable resin. In the case where the combining ratio is lower than 0.0001 parts by weight, it might be difficult to obtain the expected effect. On the other hand, in the case where the combining ratio is higher than 5 parts by weight, effects rewarding this combining ratio might not be expectable, therefore such a combining ratio might be not only unpractical, but also uneconomical.

There is no especial limitation in the above organic compound having a high boiling point if its boiling point is not lower than 150° C. Specific examples thereof include glycerin, dimethyl sulfoxide, N,N-dimethylformamide, aliphatic hydrocarbon compounds having not fewer than 8 carbon atoms, aromatic hydrocarbon compounds having not fewer than 10 carbon atoms, and higher aliphatic alcohols. These may be used either alone respectively or in combinations with each other.

The biodegradable resin composition according to the present invention, preferably, further comprises a plasticizer. Containing the plasticizer can enhance the softness of the biodegradable resin composition. This plasticizer is not especially limited, but examples thereof include phthalic compounds, phosphoric compounds, adipic compounds, sebacic compounds, azelaic compounds, citric compounds, glycolic compounds, trimellitic compounds, phthalic isomer compounds, ricinoleic compounds, polyester compounds, epoxidized soy bean oil, epoxidized butyl stearate, epoxidized octyl stearate, chlorinated paraffins, chlorinated fatty acid esters, fatty acid compounds, plant oils, pigments, and acrylic compounds. These plasticizers may be used either alone respectively or in combinations with each other.

Specific examples of the above phthalic compound include dimethyl phthalate, diethyl phthalate, dibutyl phthalate, dihexyl phthalate, di-n-octyl phthalate, di-2-ethylhexyl phthalate, diisooctyl phthalate, dicapryl phthalate, dinonyl phthalate, diisononyl phthalate, didecyl phthalate, diundecyl phthalate, dilauryl phthalate, ditridecyl phthalate, dibenzyl phthalate, dicyclohexyl phthalate, butyl benzyl phthalate, octyl decyl phthalate, butyl octyl phthalate, octyl benzyl phthalate, n-hexyl n-decyl phthalate, n-octyl phthalate, and n-decyl phthalate.

Specific examples of the above phosphoric compound include tricresyl phosphate, trioctyl phosphate, triphenyl phosphate, octyl diphenyl phosphate, cresyl diphenyl phosphate, and trichloroethyl phosphate.

Specific examples of the above adipic compound include dioctyl adipate, diisooctyl adipate, di-n-octyl adipate, didecyl adipate, diisodecyl adipate, n-octyl n-decyl adipate, n-heptyl adipate, and n-nonyl adipate.

Specific examples of the above sebacic compound include dibutyl sebacate, dioctyl sebacate, diisooctyl sebacate, and butyl benzyl sebacate.

Specific examples of the above azelaic compound include dioctyl azelate, dihexyl azelate, and diisooctyl azelate.

Specific examples of the above citric compound include triethyl citrate, acetyl triethyl citrate, tributyl citrate, acetyl tributyl citrate, and acetyl trioctyl citrate.

Specific examples of the above glycolic compound include methyl phthalyl ethyl glycolate, ethyl phthalyl ethyl glycolate, and butyl phthalyl ethyl glycolate.

Specific examples of the above trimellitic compound include trioctyl trimellitate and tri-n-octyl n-decyl trimellitate.

Specific examples of the above phthalic isomer compound include dioctyl isophthalate and dioctyl terephthalate.

Specific examples of the above ricinoleic compound include methyl acetyl recinoleate and butyl acetyl recinoleate.

Specific examples of the above polyester compound include polypropylene adipate and polypropylene sebacate.

There is no especial limitation in the combining ratio of the above plasticizer if it is in the range of 0.001 to 70 weight % of the biodegradable resin composition. This combining ratio is preferably in the range of 0.01 to 50 weight %, more preferably in the range of 0.1 to 20 weight %, most preferably in the range of 0.1 to 10 weight %. In the case where the combining ratio of the plasticizer is lower than the above range, the plasticizer might not sufficiently be contained in the biodegradable resin composition, therefore the effect of the addition of the plasticizer might not appear enough to sufficiently soften the biodegradable resin composition. On the other hand, in the case where the combining ratio of the plasticizer is higher than the above range, a biodegradable resin composition having sufficient mechanical strength might not be obtained, and further, the plasticizer might bleed out.

The biodegradable resin composition according to the present invention may further comprise a nucleating agent for the purpose of shortening the molding time, if necessary. The nucleating agent is irrespective of being an inorganic or organic substance, but examples thereof include the following substances:

simple substances, metal compounds including composite oxides, for example, carbon black, calcium carbonate, synthesized silicic acid and salts, silica, zinc white, clay, kaolin, basic magnesium carbonate, mica, talc, quartz powder, diatomite, dolomite powder, titanium oxide, zinc oxide, antimony oxide, barium sulfate, calcium sulfate, alumina, calcium silicate, and boron nitride;

low-molecular organic compounds having a metal carboxylate group, for example, metal salts of such as octylic acid, toluic acid, heptanoic acid, pelargonic acid, lauric acid, myristic acid, palmitic acid, stearic acid, behenic acid, cerotic acid, montanic acid, melissic acid, benzoic acid, p-tert-butylbenzoic acid, terephthalic acid, terephthalic acid monomethyl ester, isophthalic acid, and isophthalic acid monomethyl ester;

high-molecular organic compounds having a metal carboxylate group, for example, metal salts of such as: carboxyl-group-containing polyethylene obtained by oxidation of polyethylene; carboxyl-group-containing polypropylene obtained by oxidation of polypropylene; copolymers of olefins, such as ethylene, propylene and butene-1, with acrylic or methacrylic acid; copolymers of styrene with acrylic or methacrylic acid; copolymers of olefins with maleic anhydride; and copolymers of styrene with maleic anhydride;

high-molecular organic compounds, for example:
    α-olefins branched at their 3-position carbon atom and having not fewer than 5 carbon atoms, such as 3,3-dimethylbutene-1,3-methylbutene-1,3-methylpentene-1,3-methylhexene-1, and 3,5,5-trimethylhexene-1; polymers of vinylcycloalkanes such as vinylcyclopentane, vinylcyclohexane, and vinylnorbornane; polyalkylene glycols such as polyethylene glycol and polypropylene glycol; poly(glycolic acid); cellulose; cellulose esters; and cellulose ethers;

phosphoric or phosphorous acid and its metal salts, such as diphenyl phosphate, diphenyl phosphite, sodium bis(4-tert-butylphenyl)phosphate, and sodium methylene (2,4-tert-butylphenyl)phosphate; sorbitol derivatives such as bis(p-methylbenzylidene)sorbitol and bis(p-ethylbenzylidene)sorbitol; and thioglycolic anhydride, p-toluenesulfonic acid and its metal salts.

Particularly preferable examples of the above-exemplified nucleating agents include calcium carbonate, mica, talc, boron nitride, synthesized silicic acid and salts, silica, clay, and kaolin. The above nucleating agents may be used either alone respectively or in combinations with each other.

The amount of the above nucleating agent which is added is preferably in the range of 0.01 to 10 parts by weight, more preferably in the range of 0.5 to 5 parts by weight, per 100 parts by weight of the biodegradable resin composition. In the case where the amount is smaller than 0.01 parts by weight, it might be difficult to obtain the expected effect. On the other hand, in the case where the amount is larger than 10 parts by weight, effects rewarding this amount might not be expectable, therefore such an amount might be not only unpractical, but also uneconomical.

If necessary, the biodegradable resin composition, according to the present invention, can further comprise other components within the range not damaging the effects of the present invention. Examples of the above other components include pigments, dyes, heat-resisting agents, antioxidants, ultraviolet stabilizers, weather-resisting agents, lubricants, antistatic agents, stabilizers, reinforcements, fire retardants, and other polymers.

The water content in each of the components which are contained in the biodegradable resin composition according to the present invention, such as biodegradable resin, filler, anionic surfactant, and plasticizer (which is added if necessary), is not especially limited, but the lower the water content is, the more preferable it is. Specifically, the water content in each of the aforementioned components is preferably not higher than 5 weight %, more preferably not higher than 1 weight %, still more preferably not higher than 0,1 weight %, most preferably not higher than 0.01 weight %, of each component. In the case where the water content in each of the aforementioned components is higher than 5 weight %, the hydrolysis of the biodegradable resin might be accelerated, therefore the molecular weight of the biodegradable resin in the biodegradable resin composition lowers in the step of mixing each component, or in the step of molding the biodegradable resin composition after the mixing step, or in the step of preserving the biodegradable resin composition after the mixing step, with the result that the mechanical strength of the biodegradable resin composition might be deteriorated.

The method of mixing together the components which are contained in the biodegradable resin composition according to the present invention, such as biodegradable resin, filler, anionic surfactant, and plasticizer (which is added if necessary), is not especially limited, but mixing with a mixing apparatus for high viscosity has the advantage of enabling easy and efficient mixing.

Specific examples of the above mixing apparatus for high viscosity include: sideways type twin-shaft kneaders equipped with agitation shafts which have a row of deformed blades and are arranged in parallel to each other; self-cleaning sideways type twin-shaft kneaders equipped with two agitation shafts, which are arranged in parallel to each other, and convex-lens-shaped paddles, which are assembled with the agitation shafts in such a manner that the rotational phases of the paddles are shifted from each other; sideways type twin-shaft kneaders equipped with agitation parts which have a shaft-free structure including a row of latticed blades and are arranged in parallel to each other; tower type kneaders equipped with plate-shaped agitation blades, which are arranged inside, and deformed spiral blades, which are arranged concentrically outside the plate-shaped agitation blades; tower type kneaders equipped with inverted-cone-shaped ribbon blades; tower type kneaders equipped with agitation blades which have a shaft-free structure including a row of twisted-lattice-shaped blades; single- or twin-screw extruders; and sideways type twin-shaft kneaders equipped with agitation shafts which have a row of deformed blades and are arranged in parallel to each other, and further equipped with a single- or twin-screw extruder for discharge.

The temperature at which the components which are contained in the biodegradable resin composition according to the present invention, such as biodegradable resin, filler, anionic surfactant, and plasticizer (which is added if necessary), are mixed together is not especially limited, but is preferably in the range of 20 to 300° C., more preferably in the range of 30 to 250° C., still more preferably in the range of 70 to 200° C., most preferably in the range of 100 to 190° C. In the case where the mixing temperature is lower than 20° C., the mixing temperature might be lower than the melting point of the biodegradable resin, therefore the biodegradable resin might not be melted enough to obtain a biodegradable resin composition having high mechanical strength. On the other hand, in the case where the mixing temperature is higher than 300° C., the biodegradable resin might be thermally deteriorated, therefore its molecular weight might lower so much that a biodegradable resin composition having high mechanical strength could not be obtained.

The molded product according to the present invention is a molded product from the aforementioned biodegradable resin composition, and is usable for various forms and uses, such as various parts, containers, materials, tools, films, sheets, fibers, foamed products, laminates, and nonwoven fabrics. The molded product according to the present invention is characterized by exhibiting excellent biodegradability, good moldability, and excellent mechanical strength, and is obtainable with good efficiency by applying conventional molding methods thereto.

The molding method for obtaining the molded product of the present invention is not especially limited. Examples of the molding method include extrusion molding, compression molding, transfer molding, injection molding, blow molding, vacuum molding and pneumatic molding. The molding temperature depends upon molding methods and apparatuses, and is therefore not especially limited, but is preferably in the range of 20 to 300° C., more preferably in the range of 30 to 250° C., still more preferably in the range of 70 to 200° C., most preferably in the range of 100 to 190° C.

Toughness or otherwise brittleness, depending on use purposes, is demanded to the molded product according to the present invention, therefore the strength of the molded product is not especially limited. The fracture elongation of the molded product is usually not less than 200%, preferably not less than 250%, more preferably not less than 300%, most preferably not less than 400%. In the case where the fracture elongation of the molded product is less than the above range, the mechanical strength of the molded product is too low, therefore the molded product is difficult to practically use for various purposes such as wrapping.

EFFECTS AND ADVANTAGES OF THE INVENTION

The biodegradable resin composition, according to the present invention, exhibits excellent biodegradability and high mechanical strength, and is easy to process by molding. Furthermore, the biodegradable resin composition, according to the present invention, is an inexpensive molding material.

Therefore, the biodegradable resin composition, according to the present invention, can be effectively used for such as disposable wrapping materials, daily necessaries and general goods.

The molded product, according to the present invention, exhibits excellent biodegradability, good moldability, and excellent mechanical strength, and is obtainable with good efficiency by conventional molding methods such as extrusion molding, injection molding, hollow molding, and vacuum molding.

Therefore, the molded product, according to the present invention, is useful for various forms and uses, such as various parts, containers, materials, tools, films, sheets, and fibers.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited thereto. Incidentally, in the examples, the unit "part (s)" denotes "part(s) by weight". The evaluation methods performed in the examples are as follows. The results thereof are collectively shown in Tables 1, 2 and 3.

(Molecular Weight)

The number-average molecular weight was measured in terms of polystyrene by gel permeation chromatography.

(Biodegradability Test)

A film having a width of 0.1 to 0.2 mm was produced from each biodegradable resin composition under conditions of 130° C., 1470 N/cm$^2$ and 2 minutes with a compression molding machine. The resultant film was buried into a planter as charged with soil, and water was then sprinkled onto the planter once a day. The planter was preserved in an isothermal and isohumid room of 23° C. and 65% relative humidity. After 100 days, a change of external appearance of the film was observed.

Incidentally, the soil as used above is a mixture of soil as sampled at Onobara, Mino-shi, Japan, soil as sampled at Nishi Otabi-cho, Suita-shi, Japan, and leaf mold in a ratio of 3:1:3.

The results are shown on the following standard.

(+): A change of external appearance was observed.

(−): No change of external appearance was observed.

(Measurement of Mechanical Strength)

A film having a width of about 0.1 to about 0.2 mm was produced from each biodegradable resin composition under conditions of 150° C., 1470 N/cm² and 2 minutes with a compression molding machine. The resultant film was subjected to tensile tests at the following test rates in accordance with JIS-K7121

Fracture strength: 1,000 mm/min.

Fracture elongation: 1,000 mm/min.

Elastic modulus: 20 mm/min.

Referential Example 1

A SUS-made reactor of 100 liters was charged with 32.5×103 parts of succinic anhydride and 371.0 parts of zirconyl octanoate, and then air in the reactor was replaced with nitrogen. Next, under stirring conditions, the reactor was gradually heated to 130° C. to melt succinic anhydride. While the pressure in the reactor was maintained in the range of 0.39 to 0.79 MPa at this temperature, 16.5×103 parts of ethylene oxide was continuously introduced into the reactor at a rate of 3.14×103 parts per hour over a period of 5.25 hours. After the introduction of ethylene oxide had been completed, an aging reaction was performed at 130° C. for 1.0 hour, thus obtaining a polymerized product. The yield of this polymerized product was 100.0%. In addition, its number-average molecular weight was 25,200 as determined by GPC measurement.

Subsequently, the resultant polymerized product was moved into another SUS-made reactor of 100 liters under nitrogen atmosphere, and thereto 474.0 parts of diphenyl phosphite was then added to perform a reaction under conditions of 60 rpm and a jacket temperature of 280° C. under a reduced pressure of 140 to 387 Pa for 1.7 hours, thus obtaining a high-molecular aliphatic polyester (1). Its number-average molecular weight was 55,000 as determined by GPC measurement.

EXAMPLE 1

A biodegradable resin composition (1) was obtained by mixing 21.5 parts of the high-molecular aliphatic polyester (1) (as obtained in Referential Example 1), 8.5 parts of corn starch (as a filler) and 0.18 parts of sodium dioctyl sulfosuccinate (as an anionic surfactant) under conditions of 30 rpm and a heater temperature of 130° C. with Laboplastmill (produced by Toyo Seiki Seisakusho Co., Ltd.) for 10 minutes.

EXAMPLE 2

A biodegradable resin composition (2) was obtained by mixing 21 parts of polycaprolactone (number-average molecular weight: 80,000), 9 parts of corn starch (as a filler) and 0.18 parts of sodium dioctyl sulfosuccinate (as an anionic surfactant) under conditions of 30 rpm and a heater temperature of 130° C. with Laboplastmill (produced by Toyo Seiki Seisakusho Co., Ltd.) for 10 minutes.

EXAMPLE 3

A biodegradable resin composition (3) was obtained by mixing 21 parts of the high-molecular aliphatic polyester (1) (as obtained in Referential Example 1), 9 parts of corn starch (as a filler), 0.18 parts of sodium dioctyl sulfosuccinate (as an anionic surfactant) and 3.18 parts of acetyl tributyl citrate (as a plasticizer) under conditions of 30 rpm and a heater temperature of 130° C. with Laboplastmill (produced by Toyo Seiki Seisakusho Co., Ltd.) for 10 minutes.

Comparative Example 1

A comparative biodegradable resin composition (1) was obtained by mixing 21.5 parts of the high-molecular aliphatic polyester (1) (as obtained in Referential Example 1) and 8.5 parts of corn starch (as a filler) under conditions of 30 rpm and a heater temperature of 130° C. with Laboplastmill (produced by Toyo Seiki Seisakusho Co., Ltd.) for 10 minutes.

Comparative Example 2

A comparative biodegradable resin composition (2) was obtained by mixing 21.5 parts of the high-molecular aliphatic polyester (1) (as obtained in Referential Example 1), 0.17 parts of nonylphenol 6EO (nonionic surfactant (product by addition reaction of 6 mols of ethylene oxide to nonylphenol: nonylphenol polyethylene glycol ether)) (as a compatibilizer) and 8.5 parts of corn starch (as a filler) under conditions of 30 rpm and a heater temperature of 130° C. with Laboplastmill (produced by Toyo Seiki Seisakusho Co., Ltd.) for 10 minutes.

Comparative Example 3

A comparative biodegradable resin composition (3) was obtained by mixing 21.5 parts of the high-molecular aliphatic polyester (1) (as obtained in Referential Example 1), 0.085 parts of Surfinol 420 (acetylene glycol compound (product by addition reaction of ethylene oxide to 2,4,7,9-tetramethyl-5-decyne-4,7-diol), produced by Nisshin Kagaku Kogyo Kabushiki Kaisha) (as a compatibilizer) and 8.5 parts of corn starch (as a filler) under conditions of 30 rpm and a heater temperature of 130° C. with Laboplastmill (produced by Toyo Seiki Seisakusho Co., Ltd.) for 10 minutes.

Comparative Example 4

A comparative biodegradable resin composition (4) was obtained by mixing 21.0 parts of the high-molecular aliphatic polyester (1) (as obtained in Referential Example 1), 3.2 parts of polyethylene glycol (number-average molecular weight: 400) (as a compatibilizer) and 9.0 parts of corn starch (as a filler) under conditions of 30 rpm and a heater temperature of 130° C. with Laboplastmill (produced by Toyo Seiki Seisakusho Co., Ltd.) for 10 minutes. Incidentally, the resultant comparative biodegradable resin composition (4) felt sticky to the finger touch.

Comparative Example 5

First, a starch composition (1) was obtained by mixing 6.75 parts of corn starch (as a filler) and 2.25 parts of water under conditions of 30 rpm and a heater temperature of 80° C. with Laboplastmill (produced by Toyo Seiki Seisakusho Co., Ltd.) for 5 minutes. Next, a comparative biodegradable resin composition (5) was obtained by mixing 21.0 parts of the high-molecular aliphatic polyester (1) (as obtained in Referential Example 1) and 9 parts of the starch composition (1) under conditions of 30 rpm and a heater temperature of 130° C. with Laboplastmill (produced by Toyo Seiki Seisakusho Co., Ltd.) for 10 minutes.

Comparative Example 6

First, a thermoplastic starch composition (1) was obtained by mixing 8.54 parts of corn starch (as a filler), 2.71 parts of sorbitol (as a compatibilizer) and 1.86 parts of glycerol (as a compatibilizer) under conditions of 30 rpm and a heater temperature of 150° C. with Laboplastmill (produced by Toyo Seiki Seisakusho Co., Ltd.) for 10 minutes. Next, a comparative biodegradable resin composition (6) was obtained by mixing 16.89 parts of the high-molecular aliphatic polyester (1) (as obtained in Referential Example 1) and 13.11 parts of the thermoplastic starch composition (1) under conditions of 30 rpm and a heater temperature of 130° C. with Laboplastmill (produced by Toyo Seiki Seisakusho Co., Ltd.) for 10 minutes.

TABLE 1

|  | Example 1 | Example 2 | Example 3 |
| --- | --- | --- | --- |
| Biodegradable resin (parts) | High-molecular aliphatic polyester (1) (21.5 parts) | Polycaprolactone (21.0 parts) | High-molecular aliphatic polyester (1) (21.0 parts) |
| Filler (parts) | Corn starch (8.5 parts) | Corn starch (9.0 parts) | Corn starch (9.0 parts) |
| Anionic surfactant (parts) | Sodium dioctyl sulfosuccinate (0.18 parts) | Sodium dioctyl sulfosuccinate (0.18 parts) | Sodium dioctyl sulfosuccinate (0.18 parts) |
| Plasticizer (parts) | None | None | Acetyl tributyl citrate (3.18 parts) |
| Fracture strength (N/cm$^2$) | 1,863 | 1,373 | 1,569 |
| Fracture elongation (%) | 450 | 500 | 390 |
| Elastic modulus (N/mm$^2$) | 530 | 334 | 145 |
| Biodegradability | (+) | (+) | (+) |

TABLE 2

|  | Comparative Example 1 | Comparative Example 2 | Comparative Example 3 |
| --- | --- | --- | --- |
| Biodegradable resin (parts) | High-molecular aliphatic polyester (1) (21.5 parts) | High-molecular aliphatic polyester (1) (21.5 parts) | High-molecular aliphatic polyester (I) (21.5 parts) |
| Filler (parts) | Corn starch (8.5 parts) | Corn starch (8.5 parts) | Corn starch (8.5 parts) |
| Compatibilizer (parts) | None | Nonylphenol 6EO (0.17 parts) | Surfinol 420 (0.085 parts) |
| Fracture strength (N/cm$^2$) | 980 | 1,078 | 800 |
| Fracture elongation (%) | 30 | 150 | 30 |
| Elastic modulus (N/mm$^2$) | 627 | 650 | 637 |
| Biodegradability | (+) | (+) | (+) |

TABLE 3

|  | Comparative Example 4 | Comparative Example 5 | Comparative Example 6 |
| --- | --- | --- | --- |
| Biodegradable resin (parts) | High-molecular aliphatic polyester (1) (21.0 parts) | High-molecular aliphatic polyester (1) (21.0 parts) | High-molecular aliphatic Polyester (I) (16.89 parts) |
| Filler (parts) | Corn starch (9.0 parts) | Corn starch (6.75 parts) | Corn starch (8.54 parts) |
| Compatibilizer (parts) | Polyethylene glycol (3.2 parts) | Water (2.25 parts) | Sorbitol (2.71 parts) Glycerol (1.86 parts) |
| Fracture strength (N/cm$^2$) | 800 | 650 | 1,300 |
| Fracture elongation (%) | 110 | 35 | 20 |
| Elastic modulus (N/mm$^2$) | 543 | 619 | 196 |
| Biodegradability | (+) | (+) | (+) |

From the comparison of Examples 1 and 2 with Comparative Examples 1, to 6, it is apparent that the biodegradable resin composition according to the present invention exhibits more excellent mechanical strength (fracture strength and fracture elongation) than the conventional comparative resin compositions. In addition, from Example 3, it is apparent that the use of the plasticizer enhances the softness (reduces the elastic modulus) in addition to the mechanical strength (fracture strength and fracture elongation).

In addition, from the comparison of Example 3 with Comparative Example 2, it is apparent that the anionic surfactant exhibits more excellent function of enhancing the compatibility between the biodegradable resin and the filler and therefore more greatly enhances the mechanical strength (fracture strength and fracture elongation) than the nonionic surfactant.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A biodegradable resin composition, which comprises a biodegradable resin, a filler, and an anionic surfactant, said composition being characterized in that said anionic surfactant is a sulfonic-acid-group-containing anionic surfactant, said biodegradable resin is present in the range of 30–90 weight % of said biodegradable resin composition, said filler is a starch and is present in the range of 5–90 weight % of said biodegradable resin composition, and said anionic surfactant is present in the range of 0.05–20 weight % of said biodegradable resin composition.

2. A biodegradable resin composition according to claim 1, wherein a weight ratio of said biodegradable resin to said filler is in the range of 30/70 to 90/10.

3. A biodegradable resin composition according to claim 1, which further comprises a plasticizer.

4. A biodegradable resin composition according to claim 2, which further comprises a plasticizer.

5. A molded product from the biodegradable resin composition as recited in claim 1.

6. A molded product from the biodegradable resin composition as recited in claim 2.

7. A molded product from the biodegradable resin composition as recited in claim 3.

8. A molded product from the biodegradable resin composition as recited in claim 4.

9. The biodegradable resin composition of claim 1, wherein said anionic surfactant is present in an amount effective to disperse said filler in said biodegradable resin.

10. The biodegradable resin composition of claim 1, wherein said filler is treated with said anionic surfactant to disperse said filler in said biodegradable resin.

* * * * *